(12) United States Patent
Uchiyama et al.

(10) Patent No.: US 7,069,748 B2
(45) Date of Patent: Jul. 4, 2006

(54) OPTICAL FIBER, OPTICAL FIBER PREFORM, AND MANUFACTURING METHOD THEREFOR

(75) Inventors: Keisuke Uchiyama, Sakura (JP); Masahiro Horikoshi, Sakura (JP); Koichi Harada, Sakura (JP)

(73) Assignee: Fujikura, Ltd., Tokyo (JP)

( * ) Notice: Subject to any disclaimer, the term of this patent is extended or adjusted under 35 U.S.C. 154(b) by 390 days.

(21) Appl. No.: 10/282,202

(22) Filed: Oct. 28, 2002

(65) Prior Publication Data

US 2003/0091308 A1    May 15, 2003

(30) Foreign Application Priority Data

Nov. 9, 2001  (JP) .............................. 2001-345211
Apr. 23, 2002 (JP) .............................. 2002-120960

(51) Int. Cl.
*C03B 37/018* (2006.01)
(52) U.S. Cl. .......................................... 65/378; 65/415
(58) Field of Classification Search ................ 385/123, 385/124, 141–145; 65/378, 485, 414, 415
See application file for complete search history.

(56) References Cited

U.S. PATENT DOCUMENTS 4,367,085 A * 1/1983 Suto et al. ..................... 65/415
6,003,342 A * 12/1999 Ishida et al. ................... 65/484

FOREIGN PATENT DOCUMENTS

| EP | 1136849 A1 | * | 9/2001 |
| JP | 62-027343 | | 2/1987 |
| JP | 62162638 A | * | 7/1987 |
| JP | 05-116970 | | 5/1993 |
| JP | 9263418 | | 10/1997 |

OTHER PUBLICATIONS

First Examination Report dated Dec. 12, 2003 from Indian Patent Application No. 612/CAL/02.

* cited by examiner

*Primary Examiner*—Sean Vincent
(74) *Attorney, Agent, or Firm*—Hoffmann & Baron, LLP (57) ABSTRACT

An optical fiber and an optical fiber preform having optical characteristics, such as the wavelength dispersion, close to design values by controlling the amount of change in the refractive index in the core, thereby realizing high-quality and high-speed transmission, and manufacturing methods therefor. The optical fiber or the optical fiber preform is manufactured in a manner such that at each position in the area in which the relative refractive index of the core with respect to the cladding is 80% or higher of the maximum value of the relative refractive index, the absolute value of the rate of change of the relative refractive index with respect to the position along the diameter of the cladding is 0.5 or less, where the position along the diameter of the cladding is defined by percentage with respect to the diameter.

14 Claims, 6 Drawing Sheets

OPTICAL FIBER, OPTICAL FIBER PREFORM, AND MANUFACTURING METHOD THEREFOR

BACKGROUND OF THE INVENTION

1. Field of the Invention

The present invention relates to an optical fiber, an optical fiber preform (i.e., base material), and a manufacturing method therefor, and in particular, relates to an optical fiber whose refractive index distribution is controlled so as to perform high-quality and high-speed transmission, a relevant optical fiber preform, and manufacturing methods therefor.

2. Description of the Related Art

Figure 5:
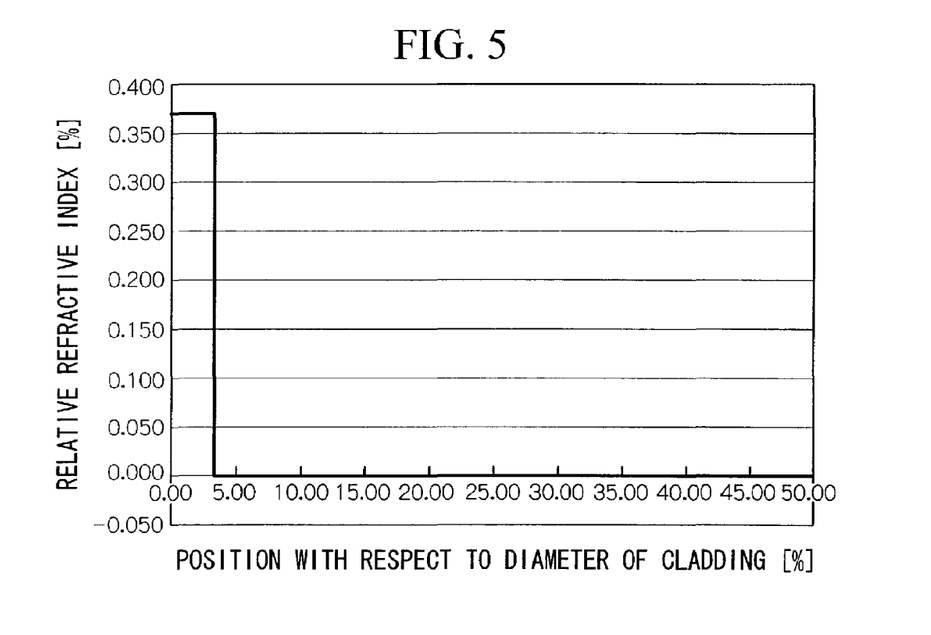
FIG. 5 shows an example of design values of the refractive index distribution of an optical fiber.
Figure 6:
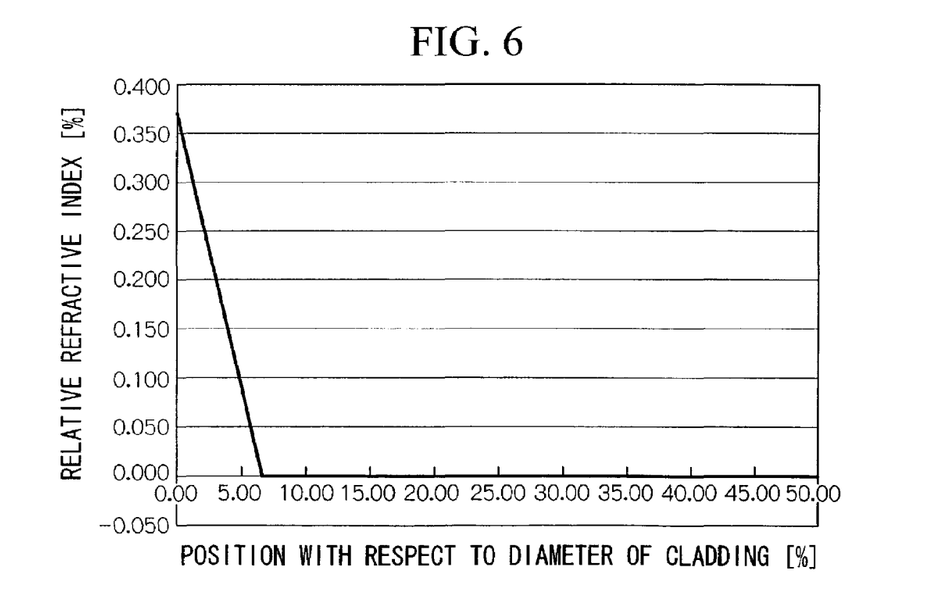
FIG. 6 shows another example of design values of the refractive index distribution of an optical fiber.

In the field of optical communication, optical fibers having a refractive index distribution having a rectangular or triangular shape are mainly designed. Examples of design values for such a refractive index distribution are shown in the graphs of FIGS. 5 and 6. In each graph, the horizontal axis indicates the position in the radial direction of the optical fiber, where the outer diameter of the cladding is defined as 100%, and the position as percentage from the center (0%) to the outer periphery (50%) of the cladding is shown (i.e., the left half (0 to −50%) is omitted in the graph). On the other hand, the vertical axis shows the relative refractive index with respect to the refractive index of the cladding.

In these examples, values for the refractive index distribution are symmetrical with respect to the center of the core of the optical fiber. Therefore, in FIGS. 5 and 6, the left end of each graph corresponds to the center of the core, and the right end of the graph corresponds to the periphery of the cladding. Accordingly, FIG. 5 shows a rectangular-shaped refractive index distribution of an optical fiber, in which the refractive index is constant in the core, and FIG. 6 shows a triangular-shaped refractive index distribution of an optical fiber, in which the refractive index is maximized at the center of the core and then decreases at a fixed rate in the core. The optical fibers having the above-explained refractive index distributions are generally used because the optical characteristics of these optical fibers can be easily estimated based on their refractive index distributions.

That is, the optical fiber has a core having a higher refractive index and a cladding having a lower refractive index. In order to obtain such a refractive index distribution, the main component of the core and cladding of the optical fiber is highly pure silica glass ($SiO_2$), and a part or all of the entire material is doped with a dopant for increasing the refractive index or a dopant for decreasing the refractive index.

The dopant for increasing the refractive index may be $GeO_2$, $TiO_2$, $SnO_2$, $ZrO_2$, $Nb_2O_5$, $Ta_2O_5$, $Yb_2O_3$, $La_2O_3$, $Al_2O_3$, or the like. The dopant for decreasing refractive index may be $B_2O_3$, F, or the like. Additionally, in order to improve the optical characteristics of glass (i.e., $SiO_2$) such as the softening point, the coefficient of thermal expansion, the chemical resistance, the transition point, and the dispersion loss, $SiO_2$ is doped with a dopant as explained above or $P_2O_5$, and further doped with another known dopant if necessary. As a more concrete example relating to the composition of the optical fiber, the core is made of $SiO_2$ which is doped with $GeO_2$ and the cladding is made of $SiO_2$.

However, generally, the refractive index distribution of the actually manufactured optical fiber has values different from the design values as shown in FIG. 5 or 6. In particular, when the optical fiber is manufactured using a VAD (vapor-phase axial deposition) method, the portion corresponding to the core is produced in a single process; thus, the probability of producing an optical fiber whose refractive index distribution has values different from the design values is high.

In addition, in the conventional process (including a heating process) of manufacturing the optical fiber, the concentration of the dopant for controlling the refractive index, which should be added only to the core area, is inevitably irregular, and such an additive (i.e., dopant) is also inevitably diffused towards the cladding area.

Therefore, irregular concentration of the additive tends to be produced in the vicinity of the boundary between the core and the cladding. Such irregular concentration of the additive produces a portion where the refractive index steeply changes (called the "refractive-index steep change portion" hereinbelow).

In conventional design of the refractive index profile, the presence of such a refractive-index steep change portion has not been considered. However, in the actually manufactured optical fiber, such a steep change in the refractive index affects the optical characteristics of the fiber, in particular, the wavelength dispersion, so that the wavelength dispersion has a value different from that anticipated in design. Such an error in the wavelength dispersion causes a waveform distortion in the optical transmission, thereby affecting the high-quality and high-speed transmission.

On the other hand, when the optical fiber is manufactured by the VAD method, (i) the refractive index distribution of a manufactured optical fiber preform is measured and the amount of drawing of the optical fiber preform is determined based on the measurement results, (ii) the refractive index distribution of the optical fiber preform after the drawing is again measured and the amount of the outside deposition is determined based on the measurement results, (iii) the refractive index distribution of the optical fiber preform after the outside deposition is again measured for confirmation, and (iv) drawing of the optical fiber preform as produced above is performed so as to produce an optical fiber.

Here, if the optical fiber preform includes a refractive-index steep change portion as explained above, the above measurement of the refractive index distribution cannot be accurately performed, so that it is difficult to produce an optical fiber having target characteristics.

SUMMARY OF THE INVENTION

In consideration of the above circumstances, an object of the present invention is to provide (i) an optical fiber having optical characteristics, such as the wavelength dispersion, close to design values by controlling the amount of change in the refractive index in the core, thereby realizing high-quality and high-speed transmission, (ii) a relevant optical fiber preform, and (iii) manufacturing methods therefor.

Therefore, the present invention provides a method of manufacturing an optical fiber preform having a core and a cladding, comprising the step of:

controlling the refractive index distribution in a manner such that at each position in the area in which the relative refractive index of the core with respect to the cladding is 80% or higher of the maximum value of the relative refractive index, the absolute value of the rate of change of the relative refractive index with respect to the position along the diameter of the cladding is 0.5 or less, where the position along the diameter of the cladding is defined by percentage with respect to the diameter.

As a typical example, the step of controlling the refractive index distribution is performed when a porous glass preform as a precursor of the optical fiber preform is produced, and the step of controlling the refractive index distribution includes (i) controlling the relative position of a burner for jetting a material for the core to a target on which the material is deposited, or (ii) controlling the angle formed by a burner for jetting a material for the core and a target on which the material is deposited.

The present invention also provides an optical fiber preform manufactured by a method as explained above.

The present invention also provides a method of manufacturing an optical fiber, comprising the step of:

drawing an optical fiber preform manufactured as explained above, so as to produce the optical fiber in which at each position in the area in which the relative refractive index of the core with respect to the cladding is 80% or higher of the maximum value of the relative refractive index, the absolute value of the rate of change of the relative refractive index with respect to the position along the diameter of the cladding is 0.5 or less, where the position along the diameter of the cladding is defined by percentage with respect to the diameter.

The present invention also provides an optical fiber manufactured by a method as explained above.

According to the present invention, it is possible to manufacture an optical fiber preform and an optical fiber in which at each position in the area in which the relative refractive index of the core with respect to the cladding is 80% or higher of the maximum value of the relative refractive index, the absolute value of the rate of change of the relative refractive index with respect to the position along the diameter of the cladding is 0.5 or less. Therefore, the optical characteristics, such as the wavelength dispersion, can have values close to the design values, thereby realizing the high-quality and high-speed transmission using optical fibers.

DESCRIPTION OF THE PREFERRED EMBODIMENTS

Hereinafter, embodiments according to the present invention will be explained with reference to the drawings.

Figure 1:
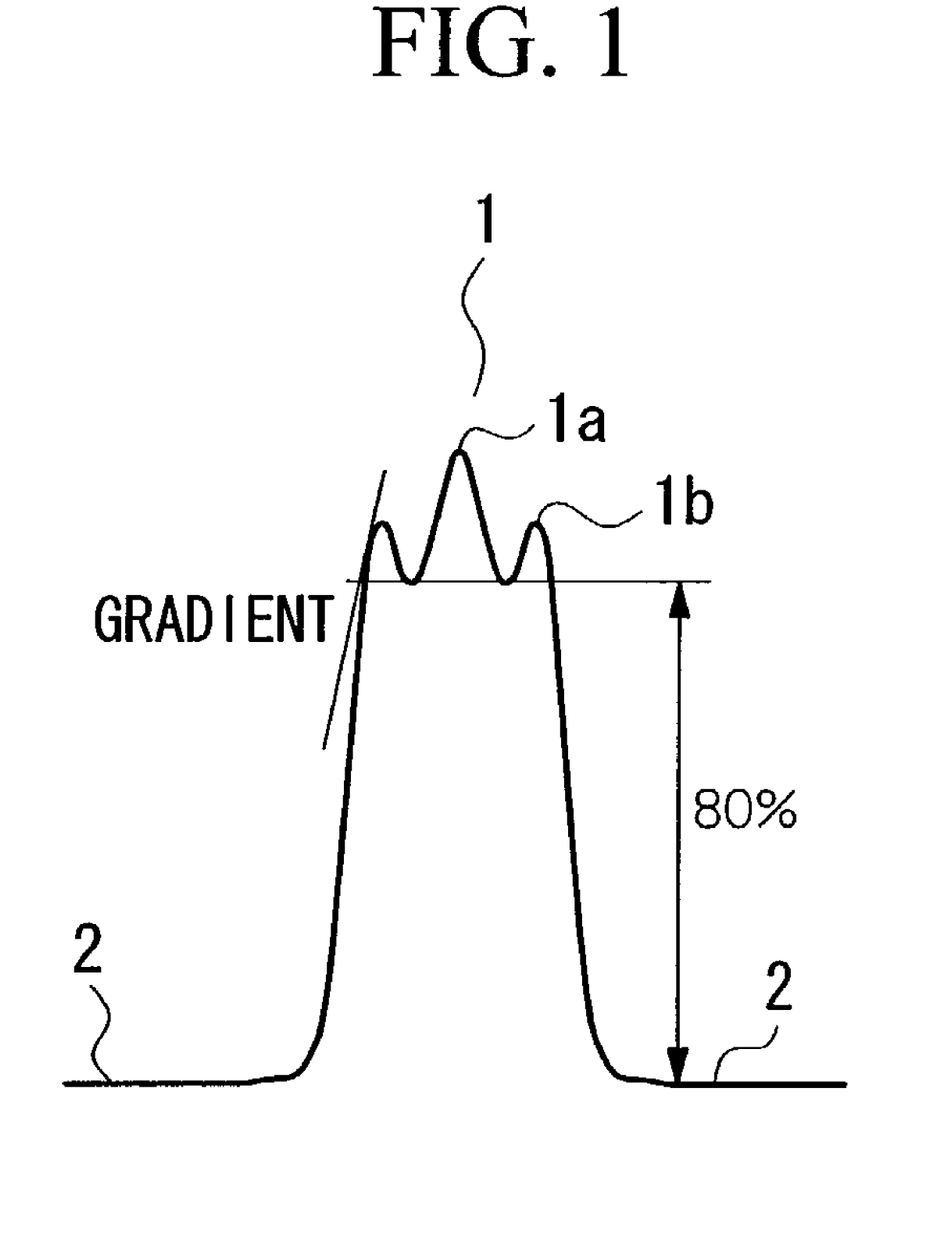
FIG. 1 is a diagram showing an example of the refractive index distribution relating to the present invention.

FIG. 1 shows an example of the refractive index distribution relating to the present invention. In FIG. 1, reference numeral 1 indicates a core portion and reference numeral 2 indicates a cladding portion. The peak of the refractive index at the center of the core is indicated by the reference symbol 1a, and a peak of the refractive index produced at the boundary between the core and the cladding is indicated by the reference symbol 1b. The optical fiber of this example is manufactured in a manner such that the rate of change of the refractive index in the core is within a predetermined range.

More specifically, the variation in the refractive index in the core is represented by the variation in the relative refractive index with respect to each position along the diameter of the cladding, and at each position in the area whose relative refractive index is 80% or higher of the maximum value of the relative refractive index (i.e., the maximum relative refractive index), the absolute value of the rate of change of the relative refractive index with respect to the diameter of the cladding is 0.5 or less.

Here, the rate of change of the relative refractive index (%) corresponds to the amount of change of the relative refractive index per 1% of the diameter (100%) of the cladding, in the radial direction of the fiber. The reason for defining the rate of change of the refractive index in the area in which the relative refractive index is 80% or higher of the maximum relative refractive index, is that in most cases, the above-explained refractive-index steep change portion is produced in such an area.

In order to measure the refractive index distribution of the optical fiber, a measurement system such as "Refractive Index Profiler S14" produced by York Technology Association, or an optical fiber analyzer "NR-9200" produced by EXFO was used.

Figure 2A:
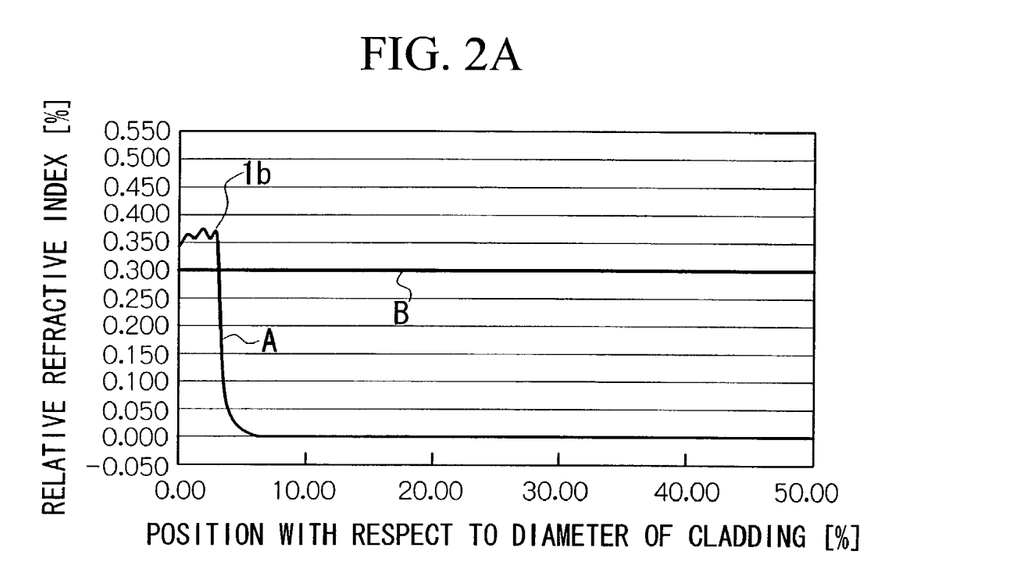
FIGS. 2A and 2B show an example of variation in the relative refractive index of an optical fiber.
Figure 2B:
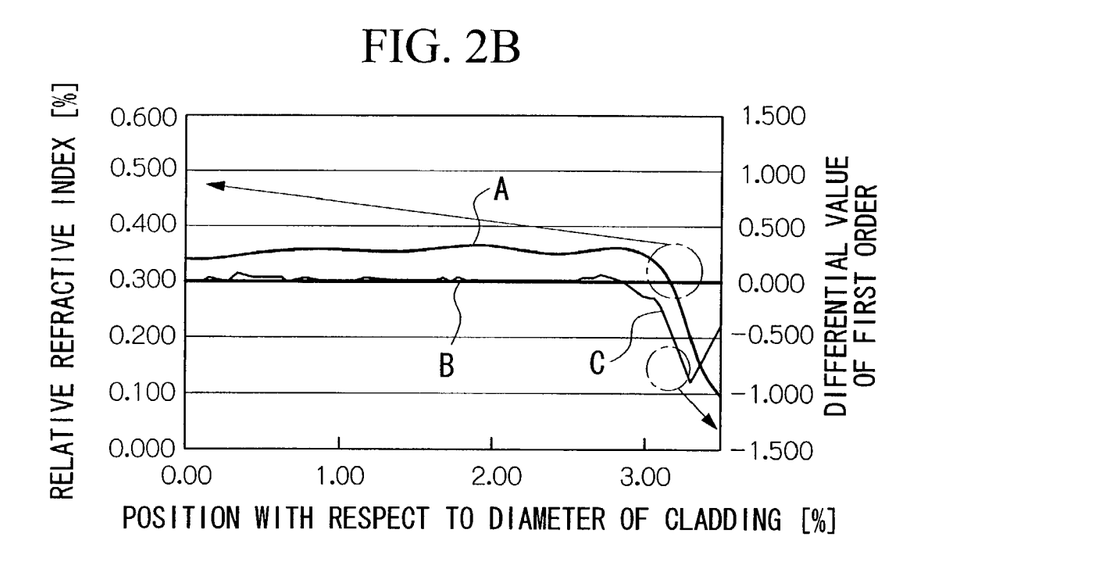

FIGS. 2A and 2B show the characteristics of an optical fiber whose refractive index distribution includes no refractive-index steep change portion.

In FIG. 2A, the horizontal axis indicates the position along the diameter of the cladding, indicated by percentage from the center (0%) to the outer periphery (50%) of the cladding, and the vertical axis indicates the relative refractive index (%) with respect to the refractive index of the cladding. In this graph, reference symbol 1b indicates a peak of the refractive index between the core and the cladding, the curve indicated by reference symbol A shows the relative refractive index with respect to the cladding (as the standard), and reference symbol B shows the 80% line with respect to the maximum value of the relative refractive index.

FIG. 2B shows an enlarged view of FIG. 2A; that is, it shows the optical characteristics of the core portion (the left end also corresponds to the center of core). In FIG. 2B, curve A and line B are the same as those in FIG. 2A, and curve C indicates differential values of first order of the relative refractive index (indicated by line A) calculated with respect to the position along the diameter, that is, curve C indicates the gradient of the relative refractive index, which numerically indicates the degree of change in the refractive index.

In FIG. 2B, the change of the peak 1b of the refractive index is moderate, and the refractive index distribution shows a small variation. Therefore, the differential values of first order are generally small. As a result, the above-explained condition is satisfied; that is, at each position in the area in which the relative refractive index is 80% or higher of the maximum relative refractive index of the optical fiber, the absolute value of the rate of change of the relative refractive index with respect to the position (%) along the diameter (100%) of the cladding is 0.5 or less.

Figure 3A:
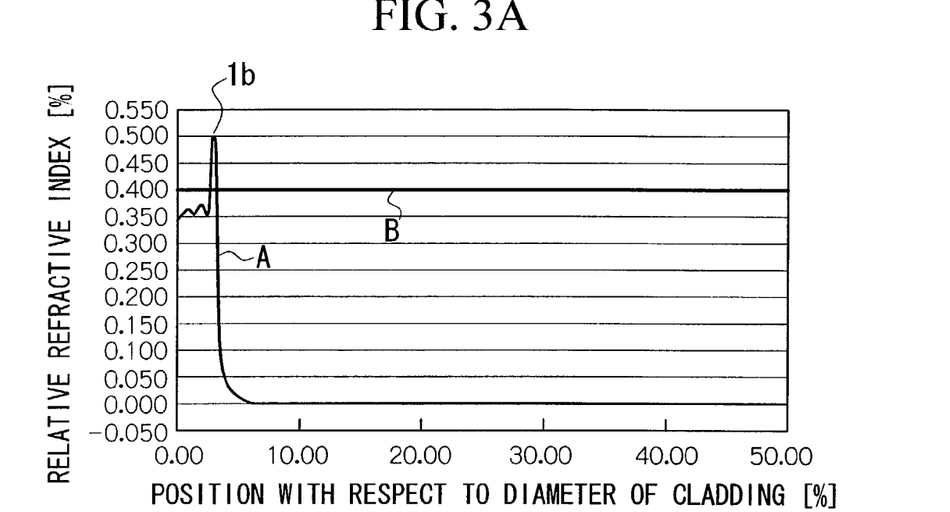
FIGS. 3A and 3B show another example of variation in the relative refractive index of an optical fiber.
Figure 3B:
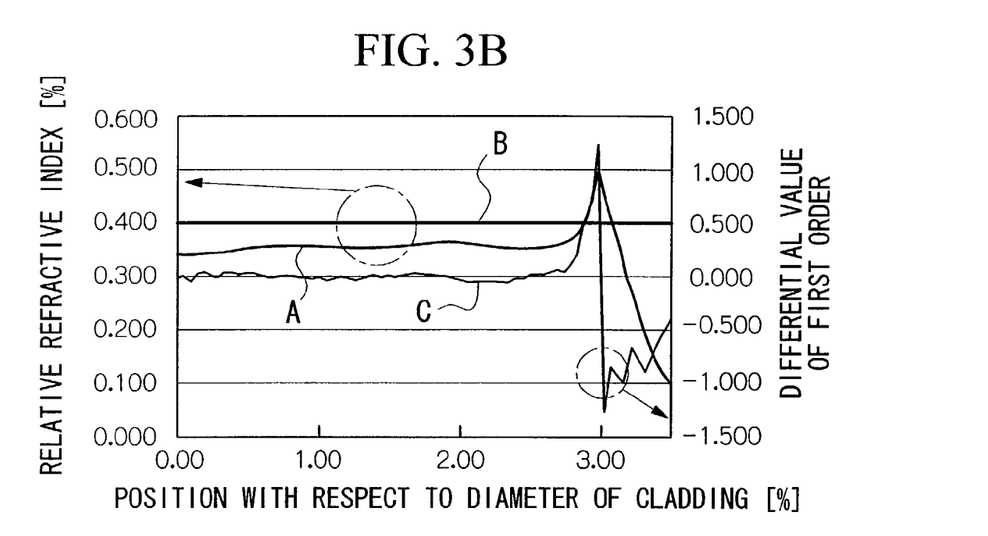

A comparative example with respect to the refractive index distribution according to the present invention is shown in FIGS. 3A and 3B, which show a variation in the refractive index of an optical fiber which includes a refractive-index steep change portion.

In FIGS. 3A and 3B, the horizontal and vertical axes and each reference symbol respectively correspond to those of FIGS. 2A and 2B. As shown in FIG. 3B, the change of the peak 1b of the refractive index is steep; thus, in this refractive-index steep change portion, the absolute value of the differential value of first order exceeds 1.0, which is larger in comparison with the case shown in FIG. 2B.

The reason for determining the absolute value of the gradient of the relative refractive index as explained above will be explained below.

Figure 4A:
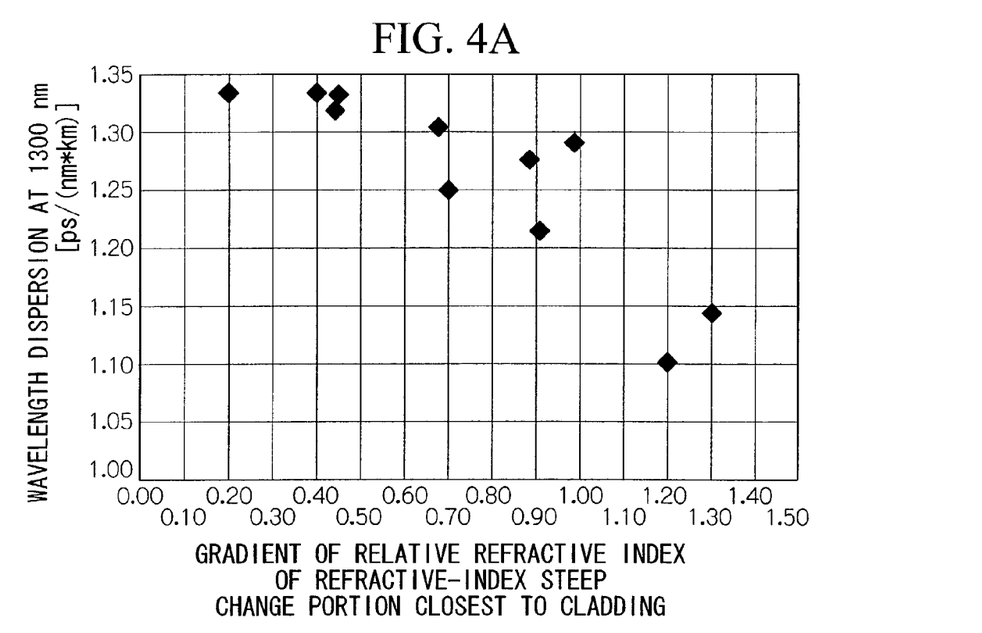
FIG. 4A is a graph showing the wavelength dispersion at 1300 nm, with respect to the gradient of the relative refractive index of the refractive-index steep change portion which is closest to the cladding in the area in which the relative refractive index is 80% or higher of the maximum relative refractive index.

FIG. 4A shows the optical characteristics of the refractive-index steep change portion which is closest to the cladding in the area in which the relative refractive index is 80% or higher of the maximum relative refractive index. The horizontal axis shows the gradient of the relative refractive index, and the vertical axis indicates the wavelength dispersion at 1300 nm. In FIG. 4A, the design value for the wavelength dispersion is 1.33 ps/(nm·km). When the wavelength dispersion in the horizontal axis closes to 1.33 ps/(nm·km), it means that an optical fiber having a wavelength dispersion corresponding to the design value can be realized. However, as the wavelength dispersion decreases from this design value, an optical fiber having a larger wavelength dispersion error with respect to the design value is inevitably produced.

In FIG. 4A, in the vicinity of the gradient "0", no refractive-index steep change portion is present and the refractive index does not change, which is an ideal state. If an optical fiber having a refractive index distribution corresponding to the design value can be manufactured, the optical fiber has wavelength dispersion corresponding to the design value. In order to realize an optical fiber for performing high-quality and high-speed transmission, the wavelength dispersion should be approximately 95% or higher of the design value. According to FIG. 4A, in the area in which the relative refractive index is 80% or higher of the maximum relative refractive index, it is preferable that the absolute value of the rate of change, that is, the gradient of the relative refractive index, be 0.5 or less.

In the present embodiment, the optical fiber is manufactured in a manner such that in the area where each point has a relative refractive index (of the core 1 with respect to the cladding 2) 80% or higher of the maximum relative refractive index, the absolute value of the rate of change of the relative refractive index with respect to the position (%) along the diameter (100%) of the cladding is 0.5 or less. Accordingly, it is possible to realize an optical fiber having the optical characteristics, such as the wavelength dispersion, close to the design values, thereby realizing the high-quality and high-speed transmission.

The optical fiber preform as an embodiment of the present invention will be explained below.

Figure 4B:
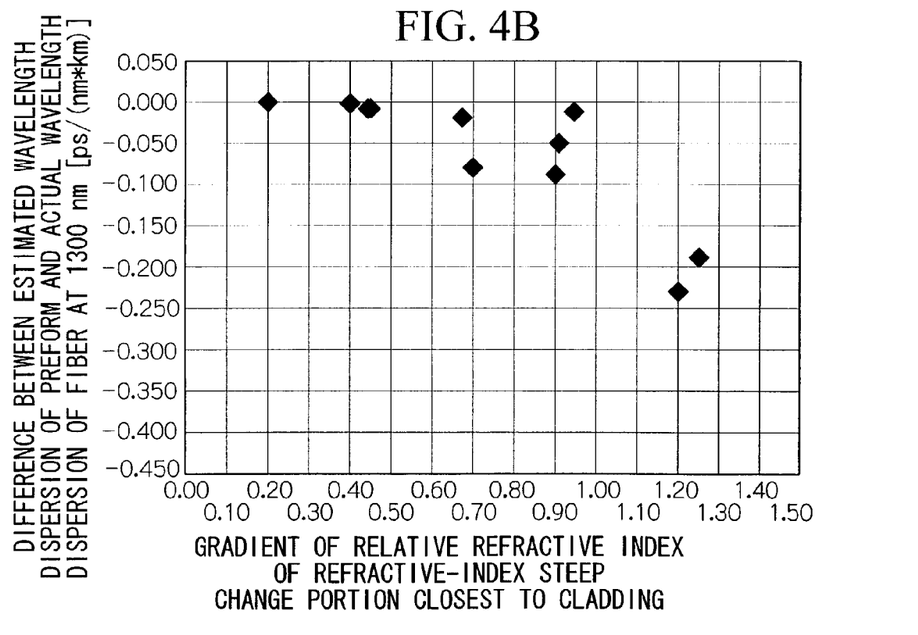
FIG. 4B is a graph showing difference between estimated wavelength dispersion at 1300 nm of the optical fiber preform and the wavelength dispersion measured for an optical fiber which is made of the optical fiber preform, with respect to the gradient of the relative refractive index of the refractive-index steep change portion which is closest to the cladding in the area in which the relative refractive index is 80% or higher of the maximum relative refractive index.

In FIG. 4B, the vertical axis indicates difference between (i) estimated wavelength dispersion at 1300 nm of the optical fiber preform and (ii) the wavelength dispersion measured for an optical fiber which is made of the optical fiber preform, and the horizontal axis shows the gradient of the relative refractive index of the refractive-index steep change portion which is closest to the cladding in the area in which the relative refractive index is 80% or higher of the maximum relative refractive index.

The rate of change of the relative refractive index corresponds to the amount of change of the relative refractive index per 1% of the diameter (100%) of the cladding, in the radial direction of the optical fiber preform. Here, the refractive index distribution of the optical fiber preform was measured at a measurement pitch of 40 μm or less.

In FIG. 4B, in the vicinity of the gradient "0", no refractive-index steep change portion is present and the refractive index does not change, which is an ideal state. If an optical fiber preform having a refractive index distribution corresponding to the design value can be manufactured, an optical fiber having wavelength dispersion corresponding to the design value can be manufactured by drawing the above optical fiber preform by using a known drawing system. In order to realize an optical fiber for performing high-quality and high-speed transmission, the wavelength dispersion should be approximately 95% or higher of the design value. According to FIG. 4B, in the area in which the relative refractive index is 80% or higher of the maximum relative refractive index, it is preferable that the absolute value of the rate of change, that is, the gradient of the relative refractive index be 0.5 or less.

Below, an embodiment for manufacturing the above-explained optical fiber preform and optical fiber will be explained with reference to FIG. 7.

Figure 7:
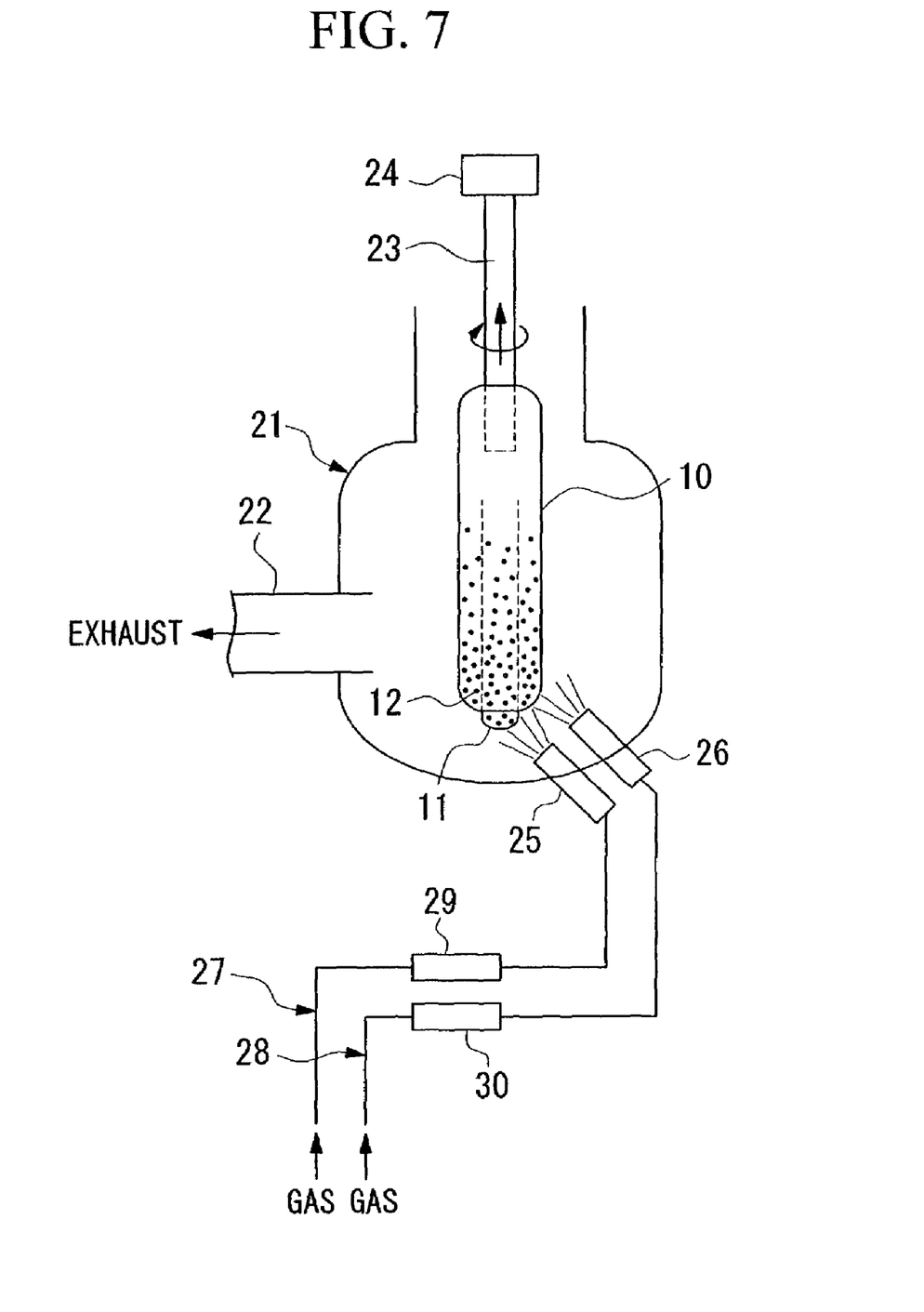
FIG. 7 is a diagram showing an example of the system for producing a porous glass preform which is used for manufacturing an optical fiber according to the present invention.

In FIG. 7, reference numeral 21 indicates a reaction container, reference numeral 22 indicates an exhaust pipe of the reaction container 21, reference numeral 23 indicates a target having a rod shape, reference numeral 24 indicates a rotary lifting mechanism for the target 23, reference numerals 25 and 26 indicate burners for synthesizing glass particles, reference numerals 27 and 28 indicate glass material supply systems which respectively have mass flow controllers 29 and 30.

As is known, the rotary lifting mechanism 24, positioned above the reaction container 21, is provided so as to insert and pull out the target 23, which is vertically held by the mechanism 24, into and from the reaction container 21.

The burners 25 and 26 have a known structure in which a plurality of gas supply passages are arranged in a concentric-circle form. The gas supply passages may supply a gas as main material ($SiCl_4$), a gas as an additional material (i.e., a gas as material for doping, such as $GeCl_4$), a fuel gas ($H_2$), an auxiliary fuel gas ($O_2$), a buffer gas (Ar), or the like. In addition to the mass flow controllers 29 and 30, each of the glass material supply systems 27 and 28 includes a liquefied material tank, a carrier gas supply tank, a bubbling vessel for producing a material gas, and the like.

The above-explained burners 25 and 26 are attached to the reaction container 21 through the wall surface of the container, between a side face and the lowest portion of the container, as shown in FIG. 7. The heads of the burners 25 and 26 are directed towards the lower end of the target 23 which is lowered by the rotary lifting mechanism 24.

FIG. 7 shows the system for performing the VAD method so as to produce a porous glass preform 10 which is a precursor of an optical fiber preform, where the porous glass preform 10 includes a porous glass layer 11 for the core, and a porous glass layer 12 for the cladding. The method of producing the porous glass preform 10 will be explained below.

First, the target 23 is lowered and inserted into the reaction container 21 while being rotated in a single rotation direction by the rotary lifting mechanism 24. The above-explained burners 25 and 26 are respectively assigned to the core and the cladding, and $SiCl_4$, $GeCl_4$, $H_2$, $O_2$, and Ar are supplied to the corresponding passages of the burner 25 for the core, while $SiCl_4$, $H_2$, $O_2$, and Ar are supplied to the corresponding passages of the burner 26 for the cladding. These burners 25 and 26 are maintained in a state of combustion.

In each of the burners 25 and 26 in the combustion sate, a known "flame hydrolysis reaction" occurs, thereby producing soot-like glass particles. These glass particles are jetted from the head of each burner towards the lower end of the target 23 so that the particles are deposited on the lower end.

Accordingly, at the lower end of the target 23, the porous glass preform 10 is produced, which includes the porous glass layer 11 for the core and the porous glass layer 12 for the cladding, where these layers are integrated in a concentric-circle form. As the porous glass preform 10 grows along the axial direction of the target, the target 23 is raised by the rotary lifting mechanism 24.

Instead of the single burner 26 for the cladding, a plurality of burners may be assigned to the cladding.

In the present embodiment, in order to produce the porous glass preform 10, one or both of the following methods are performed: (i) the position of the burner 25 for the core is relatively shifted with respect to the position of the target 23, in the vertical, longitudinal, and crosswise directions, and (ii) the angle formed by the burner 25 (for the core) and the target 23 is controlled and changed. According to these methods, it is possible to obtain an optical fiber preform in which at each position in the area in which the relative refractive index of the core with respect to the cladding is 80% or higher of the maximum relative refractive index, the absolute value of the rate of change of the relative refractive index with respect to the position along the diameter (100%) of the cladding is 0.5 or less.

That is, when the porous glass layers 11 and 12 of the porous glass preform 10 are made transparent by using a known electric furnace, an optical fiber preform having transparent glass layers for the core and cladding can be obtained.

An optical fiber can be obtained by drawing the above-produced optical fiber preform by using a known drawing system, and the optical fiber immediately after the drawing process is then coated with a primary coating, a secondary coating, or the like, thereby producing a coated optical fiber. This coating process is performed simultaneously with the above drawing process.

The following variations may also be employed so as to produce the optical fiber preform.

In the first variation, first, only the porous glass layer 11 for the core is produced using the VAD method as shown in FIG. 7, and this layer is purified using a system for producing transparent glass, so as to make a transparent glass layer for the core. In the next step, a porous glass layer 12 for the cladding is formed around the transparent glass layer for the core by using the known OVD (outside vapor deposition) method, and this layer is purified using a device for producing transparent glass, so as to make a transparent glass layer for the cladding.

In the second variation, first, a porous glass layer 11 for the core and a porous glass layer 12 for the cladding (of a specific ratio to the porous glass layer 11) are formed by using the VAD method as shown in FIG. 7. These layers are purified using a system for producing transparent glass, so as to make a transparent glass layer for the core and a transparent glass layer for the cladding. In the next process, an additional porous glass layer 12 for the cladding is formed using the OVD method around the transparent glass layer for the cladding, because only the former porous glass layer 12 is insufficient. The additional porous glass layer 12 is then purified using a system for producing transparent glass, so as to make a transparent glass layer for the cladding.

In each variation, the optical fiber preform is produced while satisfying the above-explained condition (relating to the refractive index distribution) according to the present invention.

What is claimed is:

1. A method of manufacturing an optical fiber preform having a core and a cladding for obtaining an optical fiber having a wavelength dispersion of an about 1.33 ps/(nm·km), comprising the step of:

controlling the refractive index distribution in a manner such that at each position in the area in which the relative refractive index of the core with respect to the cladding is 80 % or higher of the maximum value of the relative refractive index, the absolute value of the rate of change of the relative refractive index with respect to the position along the diameter of the cladding is 0.5 or less, where the position along the diameter of the cladding is defined by percentage with respect to the diameter.

2. A method as claimed in claim 1, wherein:

the step of controlling the refractive index distribution is performed when a porous glass preform as a precursor of the optical fiber preform is produced; and the step of controlling the refractive index distribution includes controlling the relative position of a burner for jetting a material for the core to a target on which the material is deposited.

3. A method as claimed in claim 1, wherein the step of controlling the refractive index distribution is performed when a porous glass preform as a precursor of the optical fiber preform is produced; and the step of controlling the refractive index distribution includes controlling the angle formed by a burner for jetting a material for the core and a target on which the material is deposited.

4. A method of manufacturing an optical fiber comprising a wavelength dispersion of about 1.33 ps/(nm·km), comprising the step of:

drawing an optical fiber preform as claimed in claim 1, so as to produce the optical fiber in which at each position in the area in which the relative refractive index of the core with respect to the cladding is 80% or higher of the maximum value of the relative refractive index, the absolute value of the rate of change of the relative refractive index with respect to the position along the diameter of the cladding is 0.5 or less, where the position along the diameter of the cladding is defined by percentage with respect to the diameter.

5. A method as claimed in claim 1, wherein the step of controlling the refractive index distribution includes relatively shifting a position of a burner for jetting a material for the core with respect to a position of a target on which the material is deposited, in the vertical, longitudinal, and crosswise directions while changing the angle formed by the burner for the core and the target.

6. A method as claimed in claim 1, further comprising the steps of:

lowering and inserting a target into a reaction container while being rotated in a single rotation direction by a rotary lifting mechanism;

supplying a first gas to a first burner for jetting a material for the core toward the target;

supplying a second gas to a second burner for jetting a material for the cladding toward the target;

maintaining the first and the second burners in a state of combustion; and raising the target by means of the rotary lifting mechanism.

7. A method as claimed in claim 6, wherein the first gas includes at least one component selected from the group consisting of $SiCl_4$, $GeCl_4$, $H_2$, $O_2$, and Ar.

8. A method as claimed in claim 6, wherein the first gas includes at least one component selected from the group consisting of $SiCl_4$, $H_2$, $O_2$, and Ar.

9. A method as claimed in claim 6, wherein the second burner comprises a plurality of burners.

10. A method as claimed in claim 6, wherein the first gas and the second gas are provided by means of respective glass material supply systems comprising a mass flow controller, a liquefied material tank, a carrier gas supply tank, and a bubbling vessel.

11. A method as claimed in claim 6, wherein the first burner and the second burner comprise a plurality of gas supply passages arranged in a concentric-circle form.

12. A method as claimed in claim 1, further comprising:

lowering and inserting a target into a reaction container while being rotated in a single rotation direction by a rotary lifting mechanism;

supplying a first gas to a first burner for jetting a material for the core toward the target;

supplying a second gas to a second burner for jetting a material for the cladding toward the target;

maintaining the first and the second burners in a state of combustion; and raising the target by means of the rotary lifting mechanism, and wherein the first gas includes at least one component selected from the group consisting of $SiCl_4$, $GeCl_4$, $H_2$, $O_2$, and Ar, and at least one component selected from the group consisting of $SiCl_4$, $H_2$, $O_2$, and Ar, wherein the second burner comprises a plurality of burners, wherein the first gas and the second gas are provided by means of respective glass material supply systems comprising a mass flow controller, a liquefied material tank, a carrier gas supply tank, and a bubbling vessel, and wherein the first burner and the second burner comprise a plurality of gas supply passages arranged in a concentric-circle form.

13. A method as claimed in claim 4, wherein:

the step of controlling the refractive index distribution is performed when a porous glass preform as a precursor of the optical fiber preform is produced; and the step of controlling the refractive index distribution includes controlling the relative position of a burner for jetting a material for the core to a target on which the material is deposited.

14. A method as claimed in claim 4, wherein the step of controlling the refractive index distribution is performed when a porous glass preform as a precursor of the optical fiber preform is produced; and the step of controlling the refractive index distribution includes controlling the angle formed by a burner for jetting a material for the core and a target on which the material is deposited.

* * * * *